(12) United States Patent
Michlberger et al.

(10) Patent No.: US 12,467,393 B2
(45) Date of Patent: Nov. 11, 2025

(54) WARM AIR RECIRCULATION FOR EXHAUST AFTERTREATMENT WARMUP OF INTERNAL COMBUSTION ENGINE

(71) Applicant: Southwest Research Institute, San Antonio, TX (US)

(72) Inventors: Alexander Michlberger, San Antonio, TX (US); Prathik Meruva, San Antonio, TX (US); Daniel Christopher Bitsis, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 18/389,642

(22) Filed: Dec. 19, 2023

(65) Prior Publication Data
US 2025/0198317 A1 Jun. 19, 2025

(51) Int. Cl.
*F01N 3/20* (2006.01)

(52) U.S. Cl.
CPC .................................. *F01N 3/2006* (2013.01)

(58) Field of Classification Search
CPC ........ F01N 3/021; F01N 3/103; F01N 3/2006; F01N 3/206; F01N 3/2066; F01N 9/00; F01N 13/08; F01N 2240/16; F01N 260/06; F01N 2270/02; F01N 2270/04; F01N 2270/06; F01N 2270/08; F01N 2270/10; F01N 9610/1496; F01N 2610/1433
See application file for complete search history.

(56) References Cited

U.S. PATENT DOCUMENTS

| 5,618,499 A * | 4/1997 | Lewis ............... B01D 53/8631 422/177 |
| 8,424,287 B2 * | 4/2013 | Atluri ...................... F01N 9/00 180/2.2 |
| 11,428,132 B2 * | 8/2022 | Hall ........................ F01N 9/00 |
| 11,535,238 B2 * | 12/2022 | Zhang .................. B60W 10/08 |
| 11,725,601 B1 * | 8/2023 | Liu ..................... F02D 41/0072 73/114.74 |
| 11,788,455 B1 * | 10/2023 | Liu .................... B01D 53/9495 60/274 |
| 2017/0218826 A1 * | 8/2017 | Uhrich .................. F02M 26/15 |

(Continued)

FOREIGN PATENT DOCUMENTS

GB 2254014 A * 9/1992 ........... F01N 3/2013
KR 100301659 B1 * 10/2001

*Primary Examiner* — Matthew T Largi
(74) *Attorney, Agent, or Firm* — Livingston Law Firm (57) ABSTRACT

A system and method for warming an exhaust aftertreatment device of an internal combustion engine, the aftertreatment device being installed on an exhaust line of the engine. In one embodiment, the system has a recirculation loop in fluid communication with the exhaust line at two locations, a first location being upstream the aftertreatment device and a second location being downstream the aftertreatment device. A compressor or blower is located on the recirculation loop, operable to circulate air or an air/exhaust mix within the recirculation loop, into the exhaust line upstream the aftertreatment device, through the aftertreatment device, and back into the recirculation loop. A heater is located on the recirculation loop downstream of the compressor or blower and upstream the aftertreatment device and is operable to warm the flow within the recirculation loop.

5 Claims, 8 Drawing Sheets

(56) References Cited

U.S. PATENT DOCUMENTS

2018/0135482 A1\* 5/2018 Bailey .................... F01N 3/021
2019/0292964 A1\* 9/2019 Laube .................... F01N 13/14
2022/0290594 A1\* 9/2022 Liu ....................... F01N 3/006
2023/0193860 A1\* 6/2023 Kemmerling .......... F02M 26/06
  60/605.2

\* cited by examiner

WARM AIR RECIRCULATION FOR EXHAUST AFTERTREATMENT WARMUP OF INTERNAL COMBUSTION ENGINE

BACKGROUND OF THE INVENTION

Vehicle emissions aftertreatment devices are essential devices to enable compliance with current and future emissions regulations in internal combustion engine (ICE) powered vehicles. While there are several regulated emissions species, nitrogen oxides (NOX), often represent the most challenging criteria to meet.

Modern aftertreatment devices are highly effective but require a minimum amount of thermal energy to operate. Typically, the source of this thermal energy is the exhaust gas itself. However, in cold ambient conditions and during cold starts, the aftertreatment devices may warm up slowly, resulting in high tailpipe emissions during the warmup period.

One approach to shorten this warmup time is to add thermal energy to the exhaust gas flow. Researchers have investigated various methods to increase exhaust gas energy by spraying fuel into the exhaust and/or using electric heaters to heat the exhaust gases. While these methods do significantly shorten warmup time, they are only active when the engine is running.

DETAILED DESCRIPTION OF THE INVENTION

The following description is directed to a heating system and method to enable warmup of exhaust aftertreatment device(s) of an internal combustion engine. The system and method heat warm air in a recirculation path around the aftertreatment device, enabling an efficient use of added thermal energy. High emissions associated with cold starts are mitigated. The system and method can be used in various modes-before the engine is running, during start-up, and during normal engine operation.

The system and method are well-suited to hybrid electrified vehicles but can also be used in conventional (non-electrified) internal combustion engine vehicles or even in stationary or non-road engine applications. The invention is especially beneficial for electrified vehicles due to the availability of stored electrical energy and the intermittent operation of the internal combustion engine.

Figure 1:
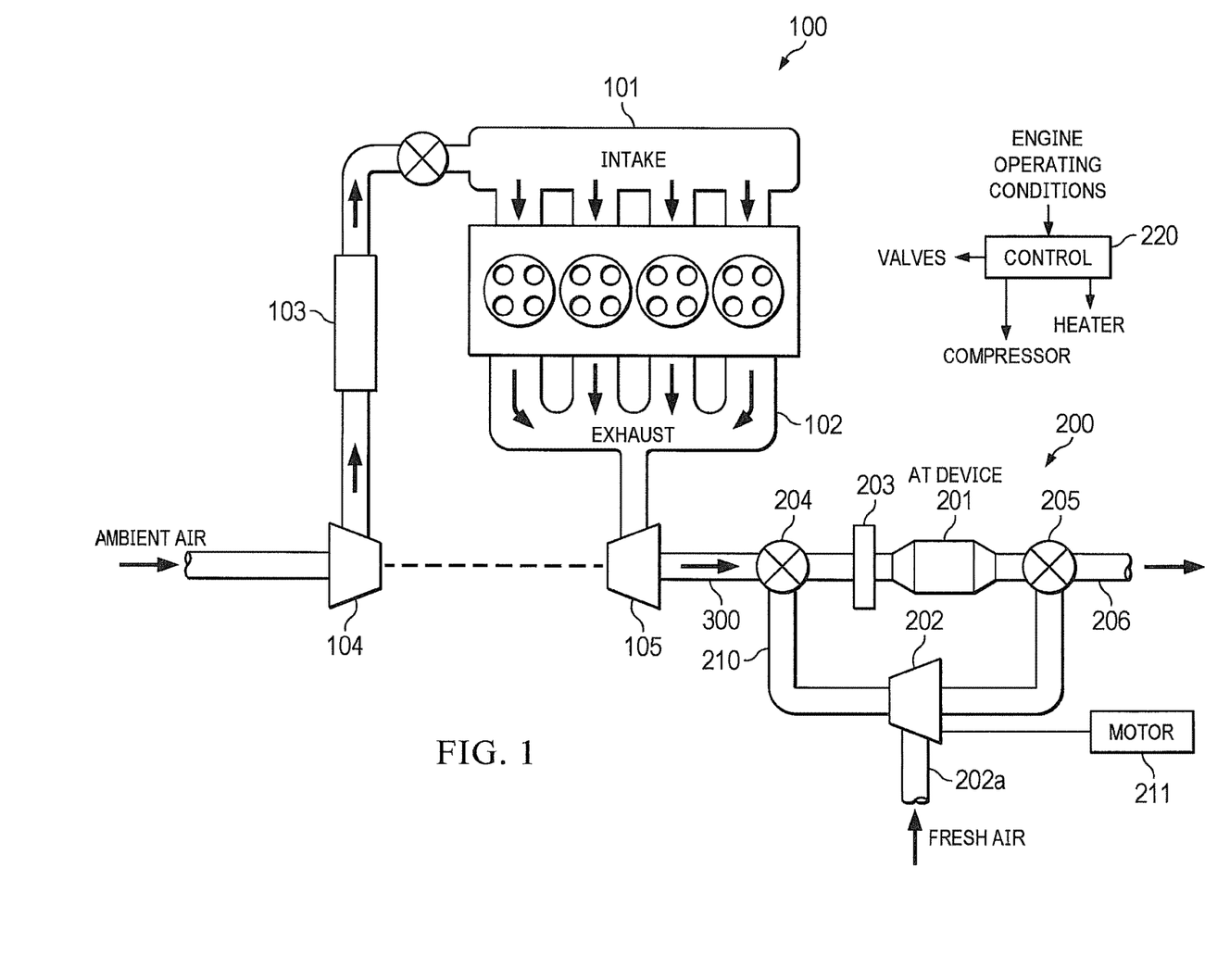
FIG. 1 illustrates an internal combustion engine equipped with a warm air recirculation loop in accordance with the invention.

FIG. 1 illustrates the aftertreatment heating system 200 used with an internal combustion engine 100. Engine 100 may be in a conventional non-electrified vehicle or may be used with a motor (not shown) in an electrified vehicle. Of significance to this description is that engine 100 emits exhaust and requires at least one exhaust aftertreatment device 201.

The exhaust is emitted through an exhaust manifold 102 and often to a turbine 105, which drives a compressor 104 used to charge the engine's intake air. In other embodiments, the engine may be naturally aspirated with the exhaust exiting through tailpipe 206 without a turbine. Engine 100 is assumed to have other parts and controls associated with internal combustion engine.

Exhaust from the engine is routed to an exhaust line 300. Aftertreatment device 201 is installed on the exhaust line 300 to treat the exhaust before it flows into the atmosphere via a tailpipe portion 206 of the exhaust line 300. In the example of this description, there is but one aftertreatment device but the same concepts apply if there is more than one.

System 200 has an air-heating loop 210 which is in fluid communication with exhaust line 300 at a point upstream the aftertreatment device 201 and again at a point downstream the aftertreatment device 201. As explained below, loop 210 allows warmed air to recirculate through the aftertreatment device 201 in the same direction as the exhaust flow, that is, from the exhaust inlet of the aftertreatment device 201 to its outlet. Two valves (three-way valves) are installed on the exhaust line 300; a first valve 204 is upstream of the aftertreatment device 201 and a second valve 205 is downstream of the aftertreatment device 201.

A compressor 202 is installed on air-heating loop 210 to create a flow of air when desired, as explained below. Compressor 202 may be implemented with various air compressors or blowers, collectively referred to herein as "compressors". Compressor 202 may use one or more different energy sources, but most likely would be an electrically powered centrifugal compressor or root-style blower driven by a motor (not shown) on-board the vehicle.

As explained below, compressor 202 is operable to circulate air or an air/exhaust mix within warm-air loop 210, into the exhaust line upstream the aftertreatment device, through the aftertreatment device(s), and back into the recirculation loop. Compressor 202 has a fresh air inlet 202a, which allows compressor 202 to receive either fresh air as well as flow from loop 210.

System 200 further has a heater 203 to heat this fresh air and/or exhaust gas flow. Heater 203 may be electrically powered or powered via another energy source. In the example of FIG. 1, heater 203 is driven with a motor 211.

In the embodiment of FIG. 1, heater 203 is located on the exhaust line 300 between the upstream valve 204 and aftertreatment device 201. However, as described below, heater 203 may also be located on the air-heating loop 210. More than one heater may be used and heaters may be located upstream or downstream of each aftertreatment device. Typically, a heater on the exhaust line portion of the recirculation path will be located at the inlet of the aftertreatment device.

Additional valving to isolate and/or direct the airflow toward specific aftertreatment components may be used but is not specifically required.

A control unit 220 controls system 200 to achieve the various modes of operation of system 200 described below. It receives data representing engine operation conditions as appropriate for determining which mode is to be in use (engine off, on, or warmup), and delivers control signals to compressor 202, heater 203, and valves 204 and 205. In other embodiments, control unit 220 may receive input representing exhaust gas and aftertreatment device conditions, such as their temperature, content, or condition such as needed for regeneration. Control unit 220 may be stand-alone or part of a larger more comprehensive control system.

Figure 2:
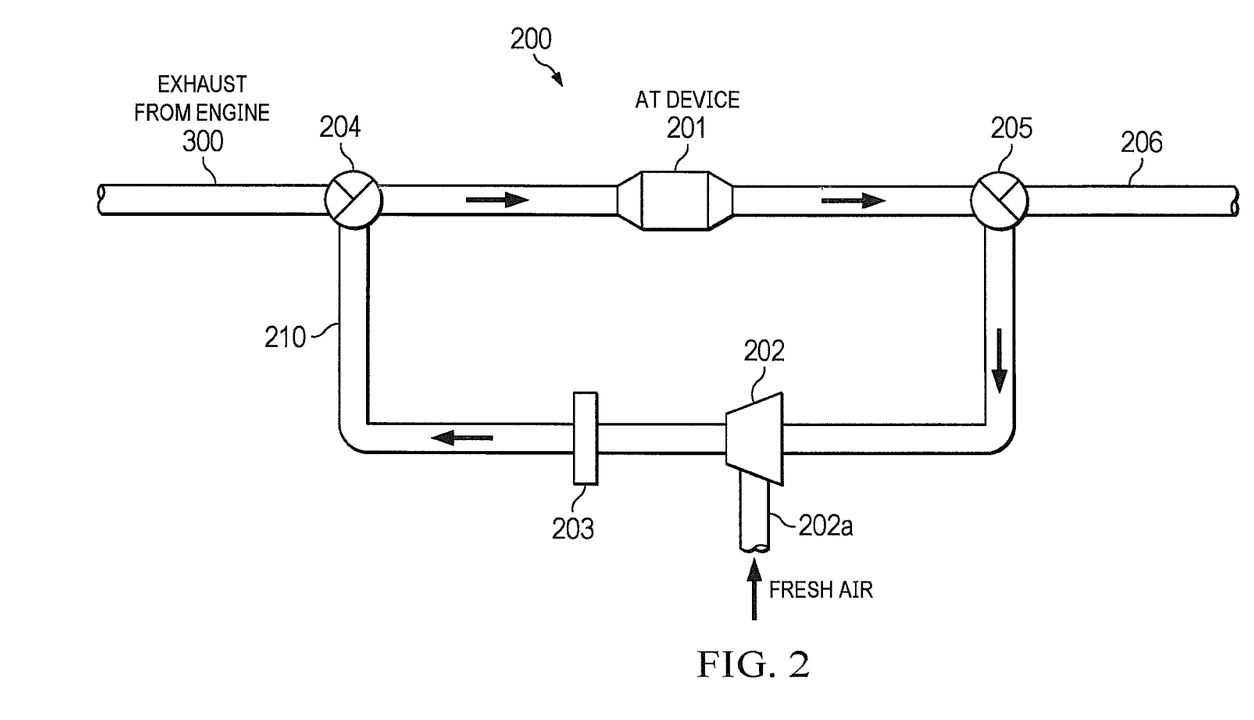
FIG. 2 illustrates the engine-off warmup mode.
Figure 3:
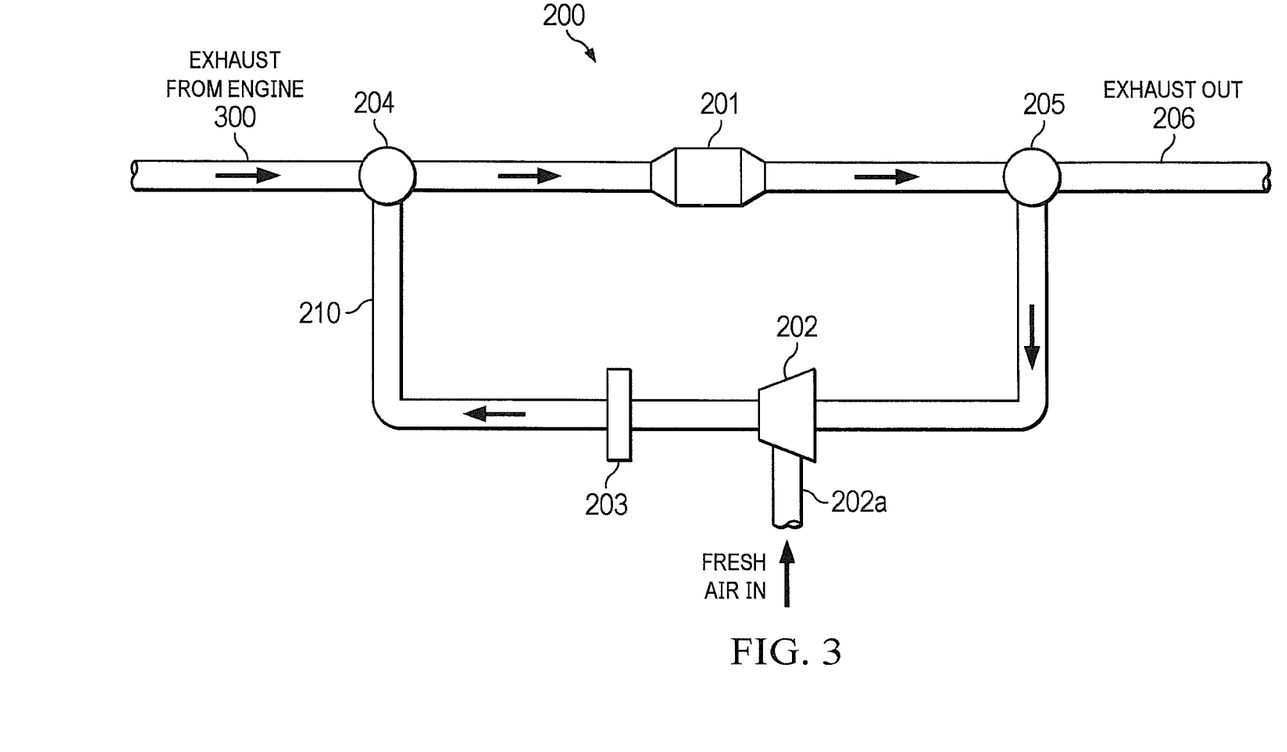
FIG. 3 illustrates the engine-on warmup mode.
Figure 4:
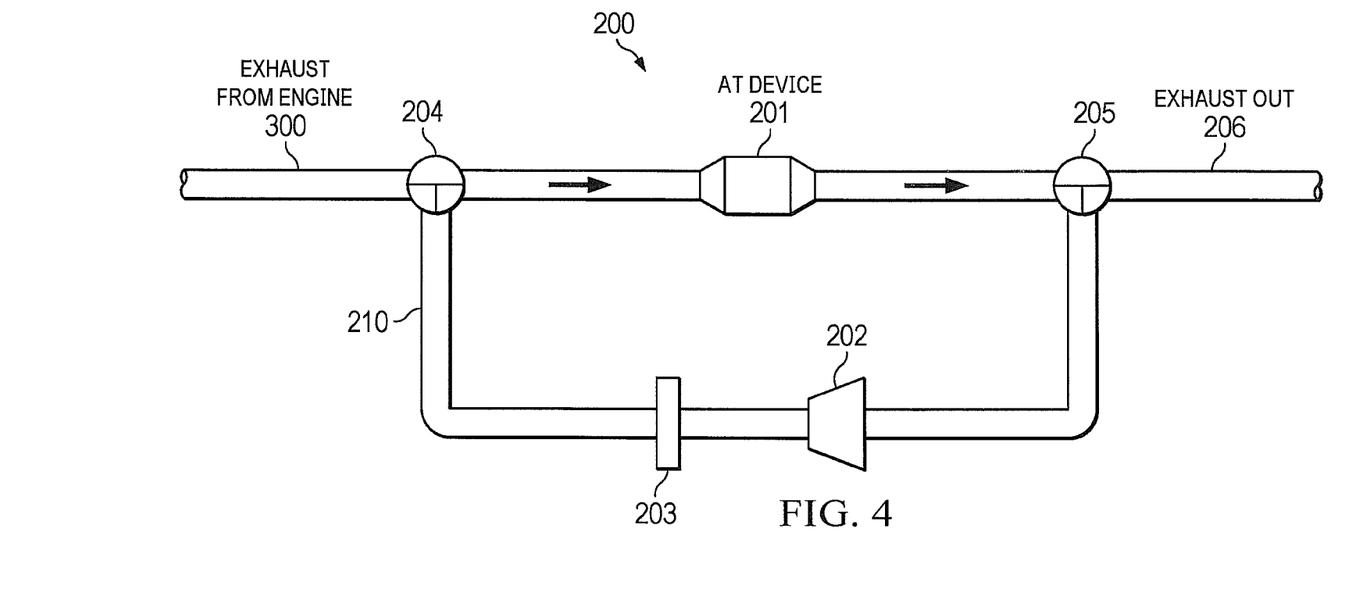
FIG. 4 illustrates the engine-on normal running mode.

FIGS. 2-4 illustrate three modes of operation of system 200. These three modes of operation are: 1) engine-off warmup mode, 2) engine-on warmup mode, 3) engine on normal running mode.

FIGS. 2-4 further illustrate an alternative location for heater 203, as compared to FIG. 1, which is on loop 210. The same modes as described below are used for either location.

FIG. 2 illustrates engine-off warmup mode. During this mode, heater 203 and compressor 202 are energized, heating fresh air which is pumped in the recirculation loop 210. Both three-way valves 204 and 205 are positioned such that the aftertreatment device 201 is isolated from the rest of the exhaust system but connected to the recirculation loop 210. Compressor 202 provides recirculating airflow through loop 210 and through the aftertreatment device 201. Heater 203 raises the temperature of the air being circulated through the aftertreatment device 201.

In engine-off warmup mode, using valves 204 and 205 as described in the preceding paragraph, engine 100 does not run because there is no path for engine exhaust gas. Although the system may be implemented without valves, this will result in leakage and reduce system efficiency.

FIG. 3 illustrates engine-on warmup mode. This mode can be used during periods of idle and low load engine operation. In this mode, with the engine running, upstream valve 204 is set to a position that allows the flow streams of exhaust line 300 and of loop 210 to mix. The downstream valve 205 is positioned to allow unrestricted flow out the tailpipe 206. The compressor's fresh air inlet 202a allows compressor 202 to draw a mixture of exhaust gas from exhaust line 300 and fresh air. This prevents drawing ambient air through tailpipe 206 to the compressor 202. Because compressor 202 draws both exhaust gas and fresh air it achieves a higher flow rate than would be achieved with engine operation alone.

Although compressor 202 need not have active flow control, in other embodiments, compressor 202 may be equipped so that its flow rate can be controlled. This feature could be used to optimize the balance between fresh air and exhaust during the engine-on warmup mode.

The engine-on warmup mode is most beneficial during low load engine operation when exhaust flow rate and temperatures are low. This is particularly true of lean-burn engines.

FIG. 4 illustrates the normal running mode. Once the aftertreatment device 201 has reached its operating temperature, the warm air loop is no longer needed. Both upstream valve 204 and downstream valve 205 are positioned such that they close off the warm air loop 210 but allow unrestricted flow through the exhaust system. The heater 203 and compressor 202 are turned off.

A feature of the above-described warmup modes is the recirculation aspect of the warm-air loop 210. In the engine-off warmup mode, valves 204 and 205 isolate warm air flow through the aftertreatment device(s) 201. In engine-on warmup mode, compressor 202 increases exhaust mass flow by supplementing the natural engine exhaust flow with fresh air drawn from inlet 202a. This blended air is heated and introduced upstream the aftertreatment device at valve 204.

For warmup (engine off or on), it is also possible to operate compressor 202 and heater 203 in an open configuration, in which valves 204 and 205 are open (or there are no valves). In other words, there is no recirculation provided by loop 210. However, this open configuration results in high energy loss because the heated air or air/exhaust is only passed through the aftertreatment device(s) once. A significant amount of the thermal energy provided by heater 203 exits the aftertreatment system via tailpipe 206.

A key benefit of using recirculation loop 210 is that heat energy is used efficiently. The heater 203 need not continually heat ambient temperature air. Because the heated air is recirculated, the required heating energy is significantly lower than in an open configuration (without recirculation around loop 210).

Another feature of the invention is the location of heater 203. In the embodiment of FIGS. 2-4, heater 203 is located in the recirculation loop 210. This location prevents heater 203 from being exposed to exhaust soot. This is in contrast to placing a heater on the exhaust line, where it is exposed to exhaust gas and degrades from exhaust even when not in use. Additionally, installing the heater directly in the exhaust line places limitations on where it can be located in the exhaust system. For example, if the exhaust system uses a diesel particulate filter (DPF), the exhaust heater is installed downstream so it is not exposed to soot.

To evaluate the effectiveness of system 200, both engine testing and computer modeling were conducted. Engine testing was conducted using a four cylinder, 2.8 L, light duty diesel engine. Exhaust aftertreatment devices 201 were a close coupled combination diesel oxidation catalyst (DOC) and diesel particulate filter (DPF), followed by two selective catalytic reduction (SCR) catalysts. For this work, an electric heater 203 was installed downstream of the DOC/DPF but upstream of the SCRs. Air under ambient conditions was compressed with a root-style blower 202 and input to the exhaust system just upstream of the heater 203. The engine was operated over the FTP-75 driving schedule, simulating hybrid vehicle operation. Testing was conducted without energizing the heater and with energizing the heater.

Figure 5:
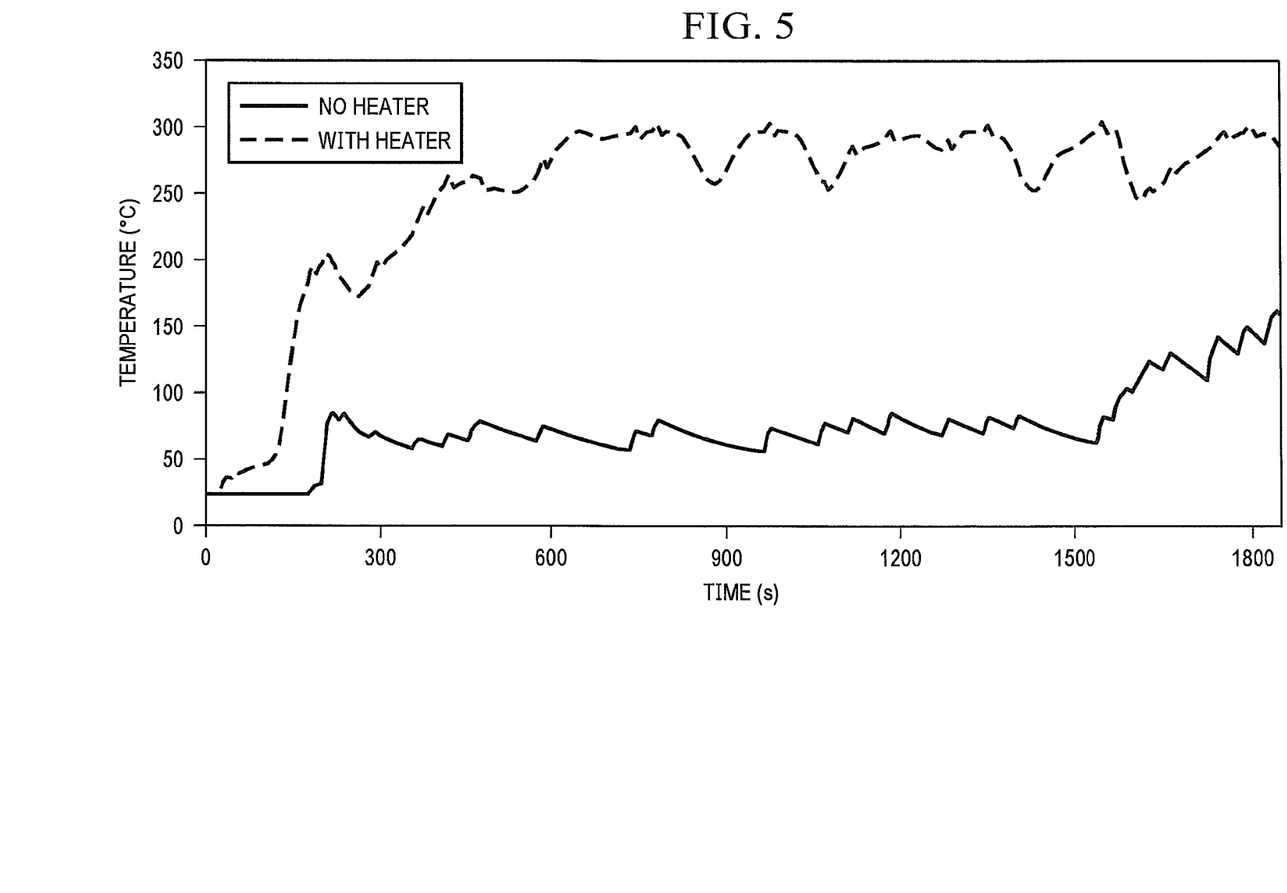
FIG. 5 illustrates cold start exhaust temperatures with and without supplemental heating.

FIG. 5 illustrates cold start exhaust temperatures, and how use of heater 203 resulted in significantly higher exhaust gas temperatures.

Figure 6:
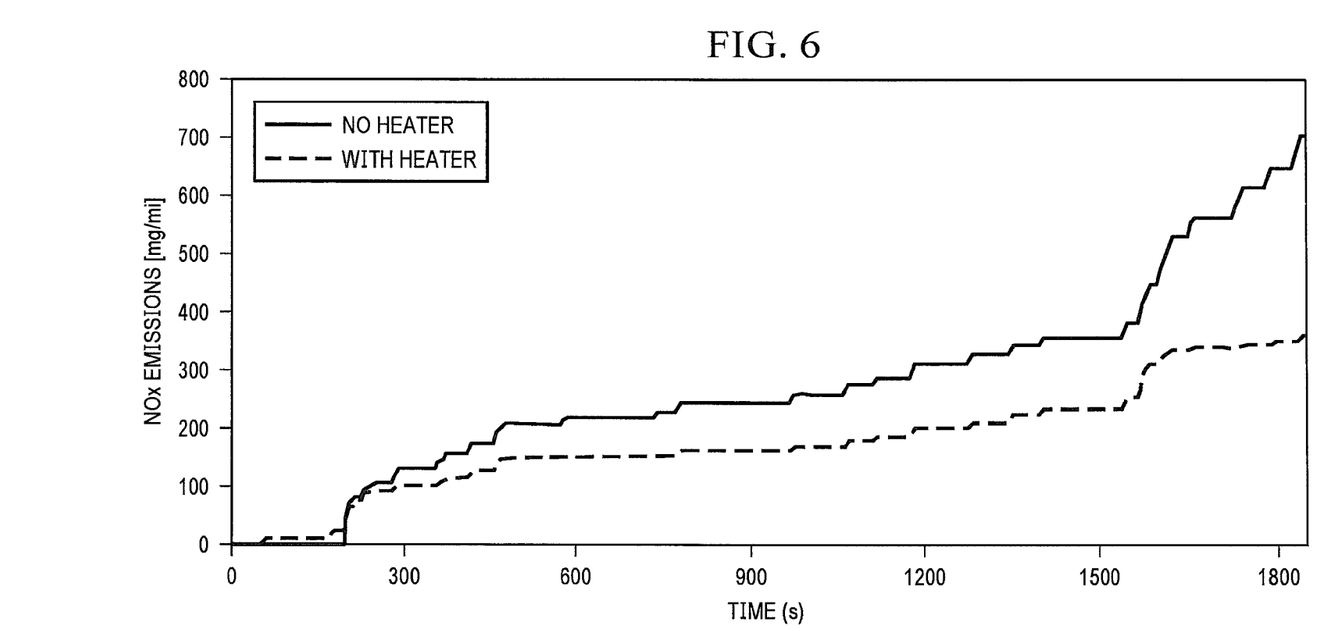
FIG. 6 illustrates cumulative NOx emissions during cold start with and without supplemental heating.

FIG. 6 illustrates cold start cumulative NOx. The higher exhaust temperatures enable more effective SCR functioning, resulting in lower cumulative NOX emissions.

Figure 7:
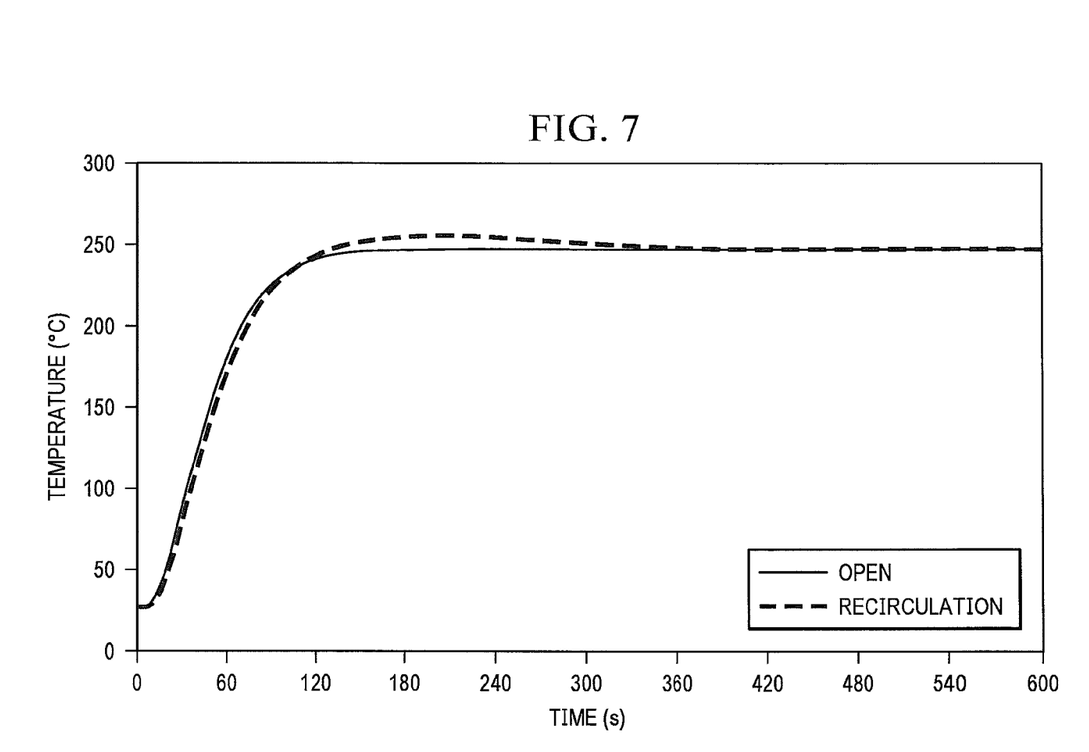
FIG. 7 illustrates exhaust gas temperatures with both open system heating and recirculation loop heating.
Figure 8:
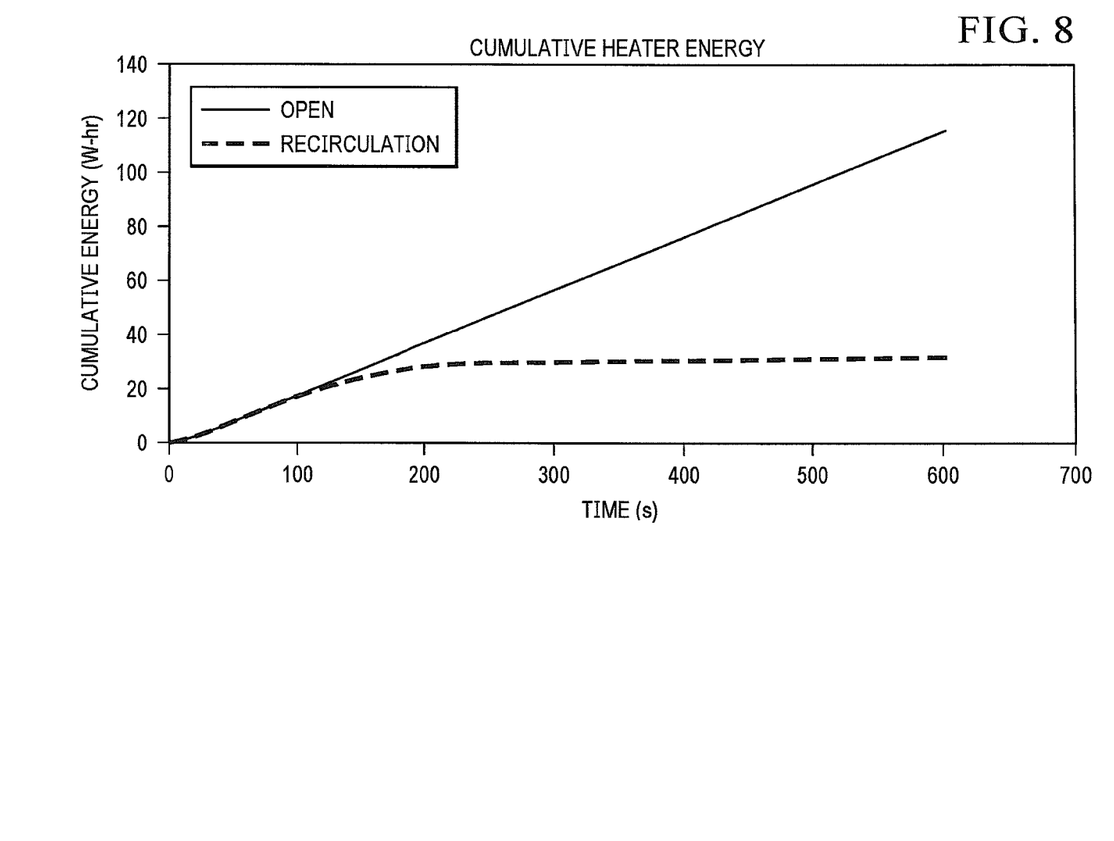
FIG. 8 illustrates heater power consumption during the heating configurations shown in FIG. 7.

FIGS. 7 and 8 illustrate both open heating (no warm air recirculation around loop 210) and recirculation heating. Over a 10-minute warmup period, the total energy consumption of the open case is approximately 115 W-hr, compared to 31.5 W-hr for the recirculating case. This indicates that recirculation heating provides an approximately 73% reduction in heater energy required as compared to open heating. The recirculating case delivers the same amount of thermal energy to the aftertreatment device(s) at a reduced energy input, making the overall system more efficient while reducing tailpipe emissions.

In addition to providing heat during engine warmup, system 200 can be used for thermal management of aftertreatment devices, such as any type of catalyst. For example, system 200 could be activated either as an isolated recirculation loop or as supplemental exhaust heating to enable catalyst regeneration or to allow an aftertreatment device to reach peak catalytic activity. As stated above, control unit 220 can be implemented to receive aftertreatment conditions and to control system 200 accordingly.

The invention claimed is:

1. A method of warming an exhaust aftertreatment device of an internal combustion engine, the aftertreatment device being installed on an exhaust line of the engine, the system comprising:

using a recirculation loop to provide a path for warmed air through the aftertreatment device, the recirculation loop being in fluid communication with the exhaust line at two locations, a first location being upstream the aftertreatment device and a second location being downstream the aftertreatment device;

operating a first three-way valve at the first location and a second three-way valve at the second location to determine when warmed air is to be recirculated;

using a compressor or blower to circulate fresh air or an air/exhaust mix within the recirculation loop, into the exhaust line upstream the aftertreatment device, through the aftertreatment device, and back into the recirculation loop;

using a fresh air input into the compressor or blower to draw fresh air into the recirculation loop when the internal combustion engine is warming up and to deliver the fresh air or the air/exhaust mix into the recirculation loop; and using a heater located on the recirculation line or on the exhaust line, between the compressor or blower and the aftertreatment device to warm the air.

2. The method of claim 1, further comprising operating the first three-way valve and the second three-way valve such that the recirculation loop is isolated from the exhaust line upstream the first location and downstream the second location, and recirculating warm fresh air while the internal combustion engine is not operating.

3. The method of claim 1, further comprising operating the first three-way valve and the second three-way valve such that the recirculation loop receives exhaust from the engine and exhaust exits from the exhaust line downstream the second location, and recirculating warm fresh air while the internal combustion engine is warming up.

4. The method of claim 1, further comprising operating the first three-way valve and the second three-way valve such that the recirculation loop is closed to the exhaust line at both the first location and the second location, and the heater and compressor or blower are turned off after the internal combustion engine is warmed up.

5. The method of claim 1, further comprising adjusting the compressor or blower output.

\* \* \* \* \*